(12) United States Patent
Cao et al.

(10) Patent No.: US 11,057,979 B2
(45) Date of Patent: Jul. 6, 2021

(54) INTELLIGENT LAMP STRING WITH INTEGRATED POWER CONTROL

(71) Applicants: Shi Cao, Yongzhou (CN); Xingming Wen, Meizhou (CN); Youchun Ding, Yongzhou (CN)

(72) Inventors: Shi Cao, Yongzhou (CN); Xingming Wen, Meizhou (CN); Youchun Ding, Yongzhou (CN)

( * ) Notice: Subject to any disclaimer, the term of this patent is extended or adjusted under 35 U.S.C. 154(b) by 0 days.

(21) Appl. No.: 16/985,248

(22) Filed: Aug. 5, 2020

(65) Prior Publication Data
US 2020/0367345 A1    Nov. 19, 2020

(51) Int. Cl.
| H05B 47/165 | (2020.01) |
| H05B 45/44 | (2020.01) |
| H05B 47/14 | (2020.01) |
| H05B 45/54 | (2020.01) |
| H05B 45/37 | (2020.01) |

(52) U.S. Cl.
CPC ........... *H05B 47/165* (2020.01); *H05B 45/37* (2020.01); *H05B 45/44* (2020.01); *H05B 45/54* (2020.01); *H05B 47/14* (2020.01)

(58) Field of Classification Search
CPC ...... H05B 47/165; H05B 45/44; H05B 47/14; H05B 45/54; H05B 45/37; H05B 47/19
See application file for complete search history.

(56) References Cited

U.S. PATENT DOCUMENTS

| 5,072,216 A | * | 12/1991 | Grange | .................... | H04Q 9/14 |
| | | | | | 362/233 |
| 7,598,686 B2 | * | 10/2009 | Lys | ...................... | H05B 47/155 |
| | | | | | 315/312 |
| 2011/0316441 A1 | * | 12/2011 | Huynh | ................ | H05B 47/185 |
| | | | | | 315/291 |

* cited by examiner

*Primary Examiner* — Daniel D Chang

(57) ABSTRACT

The present application provides an intelligent lamp string with integrated power control. Address signal modules for distinguishing different lamp holders are arranged in lamp holders, and address identification and processing modules for identifying addresses of the lamp holders and outputting corresponding signals are arranged in bulbs. By assembling a bulb with a lamp holder and electrically connecting the address identification and processing module in this bulb to the address signal module in this lamp holder to form a communication loop, the bulb will identify the address of this lamp holder, so that an individual bulb can be accurately controlled.

5 Claims, 7 Drawing Sheets

INTELLIGENT LAMP STRING WITH INTEGRATED POWER CONTROL

FIELD OF THE INVENTION

The present invention relates to the field of lamp strings, and in particular to an intelligent lamp string with integrated power control.

BACKGROUND OF THE INVENTION

Lamp strings, as decorations for festival celebration, have been widely applied to indoor and outdoor decoration. A lamp string mainly refers to a plurality of lamps connected in series or in parallel in an electric circuit. Each lamp has a bead, a lamp holder for fixing the bead and a connecting base for realizing electrical connection between the bead and a wire. The bead may be a tungsten lamp or an LED lamp. The plurality of lamps are connected to one other in series through wire sections with metal conductive terminals fixed at both ends. The conductive terminals of the wire sections are inserted into the connecting bases from the bottom of the connecting bases to be electrically connected to pins of the beads, so as to supply power to the beads.

In conventional methods for controlling lamp strings by two wires, addresses are provided in lamp bodies, or lamps change or flash arbitrarily, so that regular control cannot be realized. Moreover, since the addresses of conventional bulbs are integrated with the bulbs, if the bulbs are damaged, a user needs to replace different bulbs according to different addresses when replacing the bulbs, so that it is very difficult for the user to operate.

SUMMARY OF THE INVENTION

To solve the above problems, the present utility model provides an intelligent lamp string with integrated power control. If an address identification and processing module in a bulb is electrically connected to an address signal module in a lamp holder to form a communication loop, the bulb will identify the address of this lamp holder, and the address identification and processing module in this bulb will output a corresponding electrical signal to control a bead in the bulb to change differently, so that a single bulb can be accurately controlled. Compared with the conventional technologies, in the present application, bulbs are detachably connected to lamp holders. Moreover, since address signal modules are arranged in the lamp holders in the present application, even if a bulb is damaged, identification can be performed immediately by replacing this bulb, so that it is very convenient for maintenance and replacement.

For this purpose, the present invention employs the following technical solution. An intelligent lamp string with integrated power control is provided, including a power plug connected to a mains supply, a power control module, a plurality of lamp holders and a plurality of bulbs, wherein the power plug is electrically connected to the power control module for controlling power and outputting a driving signal; the power control module is provided with an output positive terminal V+ and an output negative terminal V−; the plurality of lamp holders are electrically connected to the output positive terminal V+ and the output negative terminal V−, respectively; address signal modules for distinguishing different lamp holders are arranged in the lamp holders; address identification and processing modules for identifying addresses of the lamp holders and outputting corresponding signals are arranged in the bulbs; the bulbs are detachably connected to the lamp holders to form a communication loop; the address identification and processing modules in the bulbs are electrically connected to the address signal modules in the lamp holders; and, the address identification and processing modules identify the address signal modules and output corresponding electrical signals to control the change of the bulbs.

Preferably, the power control module includes an AC-DC step-down circuit, a control circuit and an output driving circuit; the AC-DC step-down circuit outputs a power supply VCC to the control circuit; the control circuit includes a resistor R15, a diode D5, a capacitor C11, a capacitor C12, a control chip U5, a wireless control module H1, a switch SW1 and a control key S1; the control chip U5 is specifically FT60F021-RB; an output end of the AC-DC step-down circuit is connected to one end of the resistor R15, the other end of the resistor R15 is connected to a first pin of the control chip U5, a cathode of the diode D5 is connected to the first pin of the control chip U5, and an anode of the diode D5 is grounded; one end of the capacitor C11 is connected to the first pin of the control. chip U5, while the other end of the capacitor C11 is grounded; one end of the capacitor C12 is connected to the first pin of the control chip U5, while the other end of the capacitor C12 is grounded; a first pin of the wireless control module H1 is connected to a fifth pin of the control chip U5; a fourth pin of the wireless control module H1 is connected to a fourth pin of the control chip U5; the switch SW1 is connected to an eighth pin of the control chip U5; the control key S1 is connected to a sixth pin of the control chip U5; and, the switch SW1 controls connection or disconnection between the eighth pin of the control chip U5 and the sixth pin of the control chip U5 through the control key S1.

Preferably, the output driving circuit includes a resistor R16, a resistor R17, a resistor R21, a resistor R22, a triode Q3, an MOS transistor Q1 and a diode D6; one end of the resistor R16 is connected to a third pin of the control chip U5, the other end of the resistor R16 is connected to a base of the triode Q3, an emitter of the triode Q3 is grounded, and a collector of the triode Q3 is connected to the power supply VCC through the resistor R17; a connection node between the resistor R17 and the collector of the triode Q3 forms the output negative terminal V−, and a connection node between the resistor R17 and the power supply VCC forms the output positive terminal V+; a G electrode of the MOS transistor Q1 is connected to the base of the triode Q3, an S electrode of the MOS transistor Q1 is grounded, and a D electrode of the MOS transistor Q1 is connected to the output negative terminal V−; and, an anode of the diode D6 is grounded, while a cathode of the diode D6 is connected to the output negative terminal V− through the resistor R22.

Preferably, the power control module further includes a zero-cross signal detection circuit; the zero-cross signal detection circuit includes a resistor R12, a resistor R13 and a photoelectric coupler U3; the photoelectric coupler U3 is specifically PC817; one end of the resistor R13 is connected to the AC-DC step-down circuit, while the other end of the resistor R13 is connected to a first pin of the photoelectric coupler U3; and, a fourth pin of the photoelectric coupler U3 is connected to a seventh pin of the control chip U5.

Preferably, the address signal modules in the lamp holders are resistors R2, and the resistors R2 in the lamp holders are different in resistance; the address identification and processing modules in the bulbs comprise resistors R1, control chips U1 and RGBW bead modules; the bulbs are connected to the lamp holders, and the control chips U1 are connected to the output positive terminal V+ and the output negative terminal V−, respectively, to form a communication loop; the resistors R1 and the resistors R2 form a voltage divider circuit; and, the resistors R2 output corresponding electrical signals to the control chips U1, and the control chips U1 control the RGBW bead modules according to the electrical signals.

Preferably, the control chips U1 are specifically PMS132; one end of each of the resistors R1 is communicated with the respective control chip U1, a first pin of the control chip U1 is connected to the output positive terminal V+, and the other end of the resistor R1 is communicated with a fifth pin of the control chip U1; and, the other end of the resistor R1 is further connected to one end of the respective resistor R2, the other end of the resistor R2 is communicated with an eighth pin of the control chip U1, and the eighth pin of the control chip U1 is connected to the output negative terminal V−.

The present invention has the following beneficial effects. Address signal modules for distinguishing different lamp holders are arranged in lamp holders, and address identification and processing modules for identifying addresses of the lamp holders and outputting corresponding signals are arranged in bulbs. By assembling a bulb with a lamp holder and electrically connecting the address identification and processing module in this bulb to the address signal module in this lamp holder to form a communication loop, the bulb will identify the address of this lamp holder, and the address identification and processing module in this bulb will output a corresponding electrical signal to control different changes of a bead in the bulb, so that a single bulb can be accurately controlled. Compared with the conventional technologies, in the present application, bulbs are detachably connected to lamp holders. Moreover, since address signal modules are arranged in the lamp holders in the present application, even if a bulb is damaged, identification can be performed immediately by replacing this bulb, so that it is very convenient for maintenance and replacement.

in which: 1: power plug; 2: power control module; 21: AC-DC step-down circuit; 22: zero-cross signal detection circuit; 23: output driving circuit; 24: control circuit; 3: lamp holder; 31: address signal module; 4: bulb; and, 43: three-pin plug.

DETAILED DESCRIPTION OF THE PREFERRED EMBODIMENT

Figure 1:
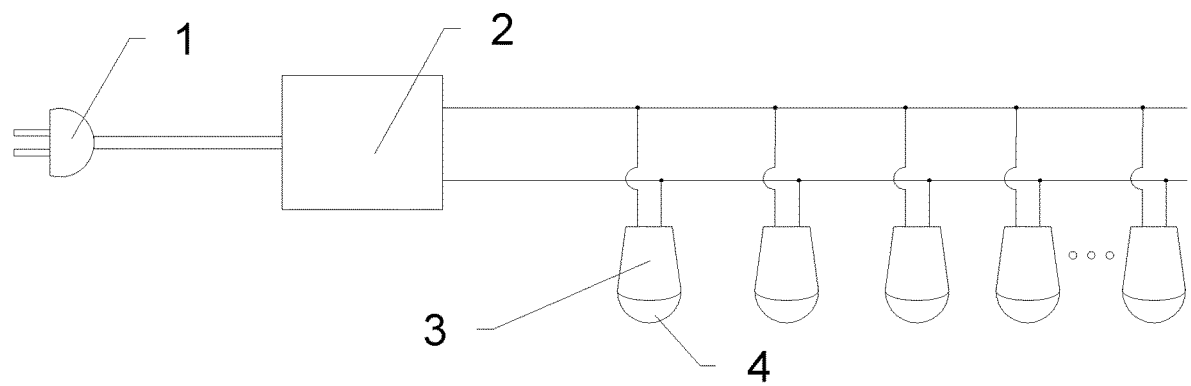
FIG. 1 is a schematic structural diagram of an overall circuit according to the present invention.

With reference to FIG. 1, the present invention provides an intelligent lamp string with integrated power control, including a power plug 1 connected to a mains supply, a power control module 2, a plurality of lamp holders 3 and a plurality of bulbs 4. The power plug 1 is electrically connected to the power control module 2 for controlling power and outputting a driving signal. The power control module 2 is provided with an output positive terminal V+ and an output negative terminal V−. The plurality of lamp holders 3 are electrically connected to the output positive terminal V+ and the output negative terminal V−, respectively. Address signal modules 31 for distinguishing different lamp holders 3 are arranged in the lamp holders 3. Address identification and processing modules for identifying addresses of the lamp holders 3 and outputting corresponding signals are arranged in the bulbs 4. The bulbs 4 are detachably connected to the lamp holders 3 to form a communication loop. The address identification and processing modules in the bulbs 4 are electrically connected to the address signal modules 31 in the lamp holders 3, and the address identification and processing modules identify the address signal modules 31 and output corresponding electrical signals to control the change of the bulbs 4.

Figure 2:
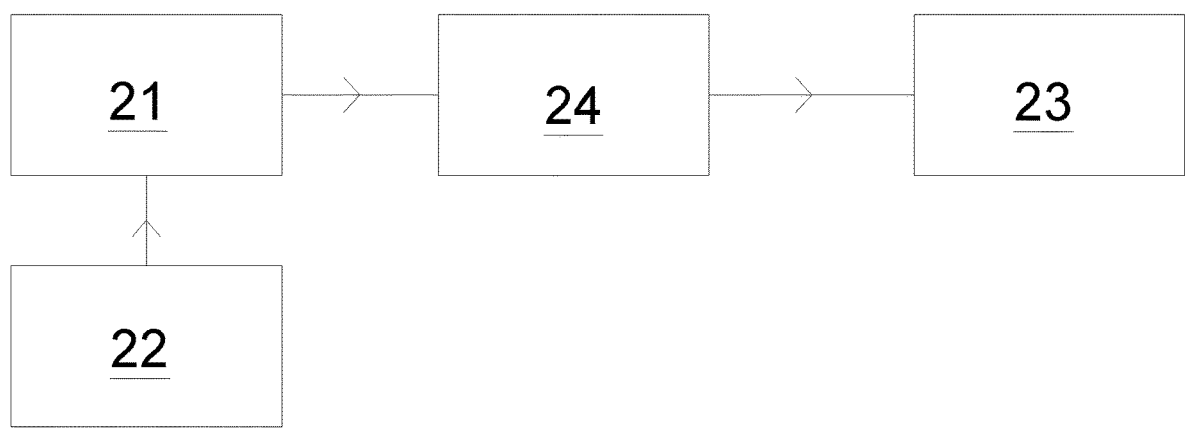
FIG. 2 is a block diagram of a power control module according to the present invention.
Figure 3:
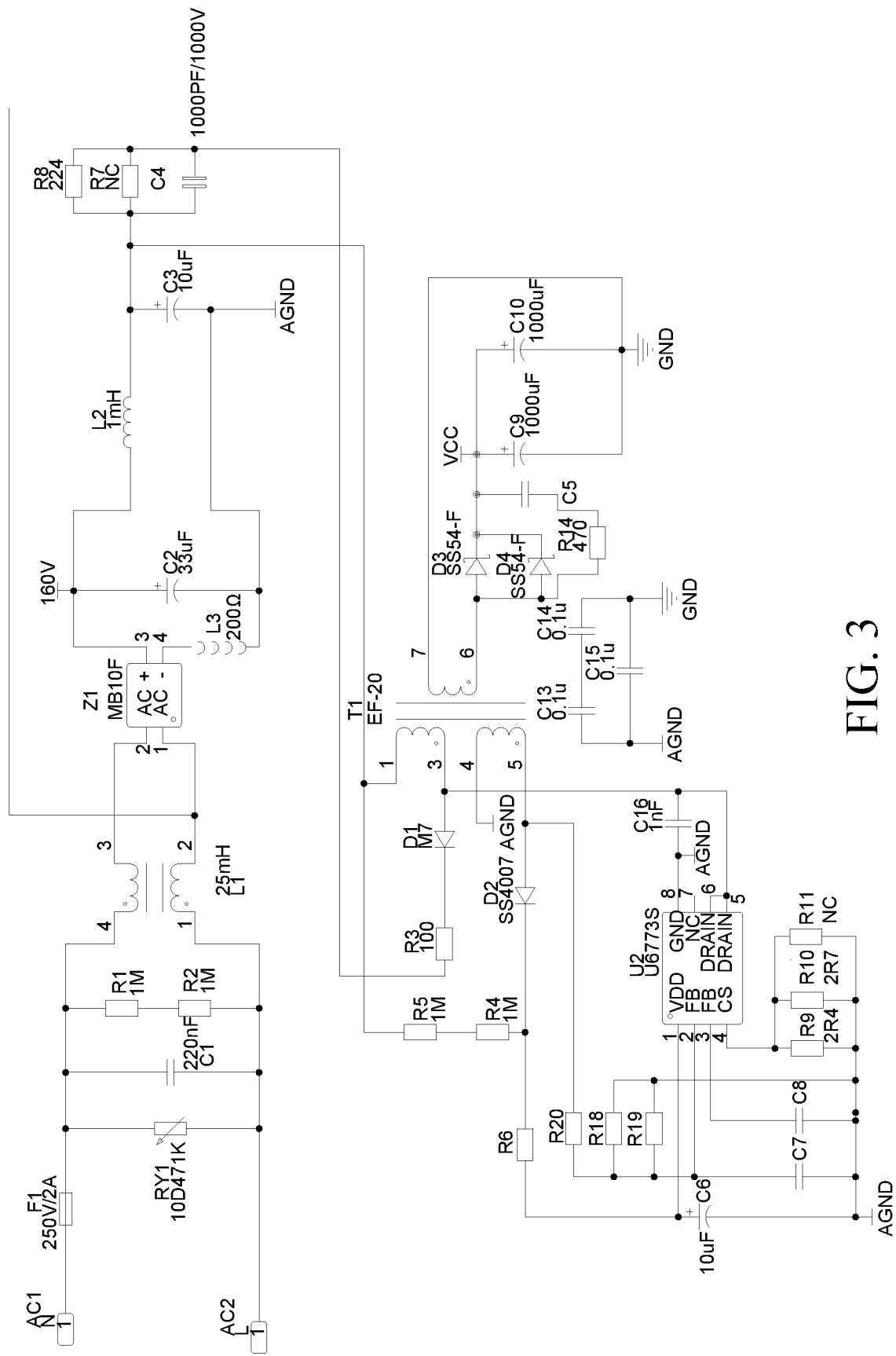
FIG. 3 is a specific circuit diagram of an AC-DC step-down circuit according to the present invention.
Figure 4:
FIG. 4 is a specific circuit diagram of a zero-cross signal detection circuit according to the present invention.
Figure 6:
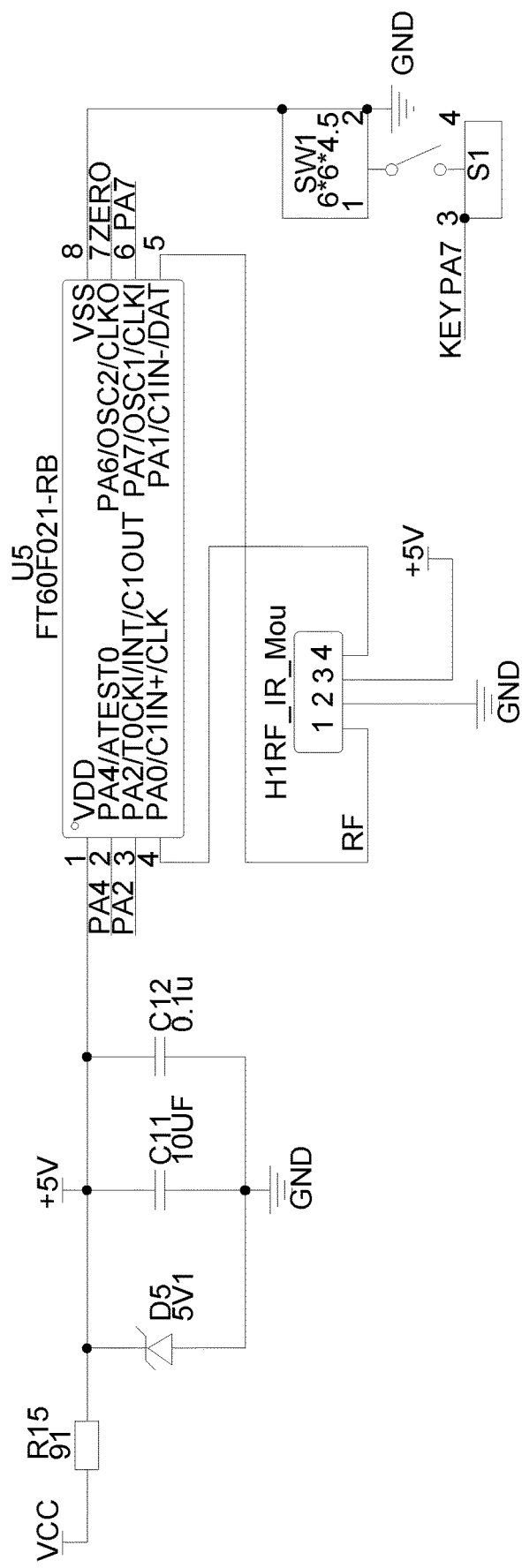
FIG. 6 is a specific circuit diagram of a control circuit according to the present invention.
Figure 7:
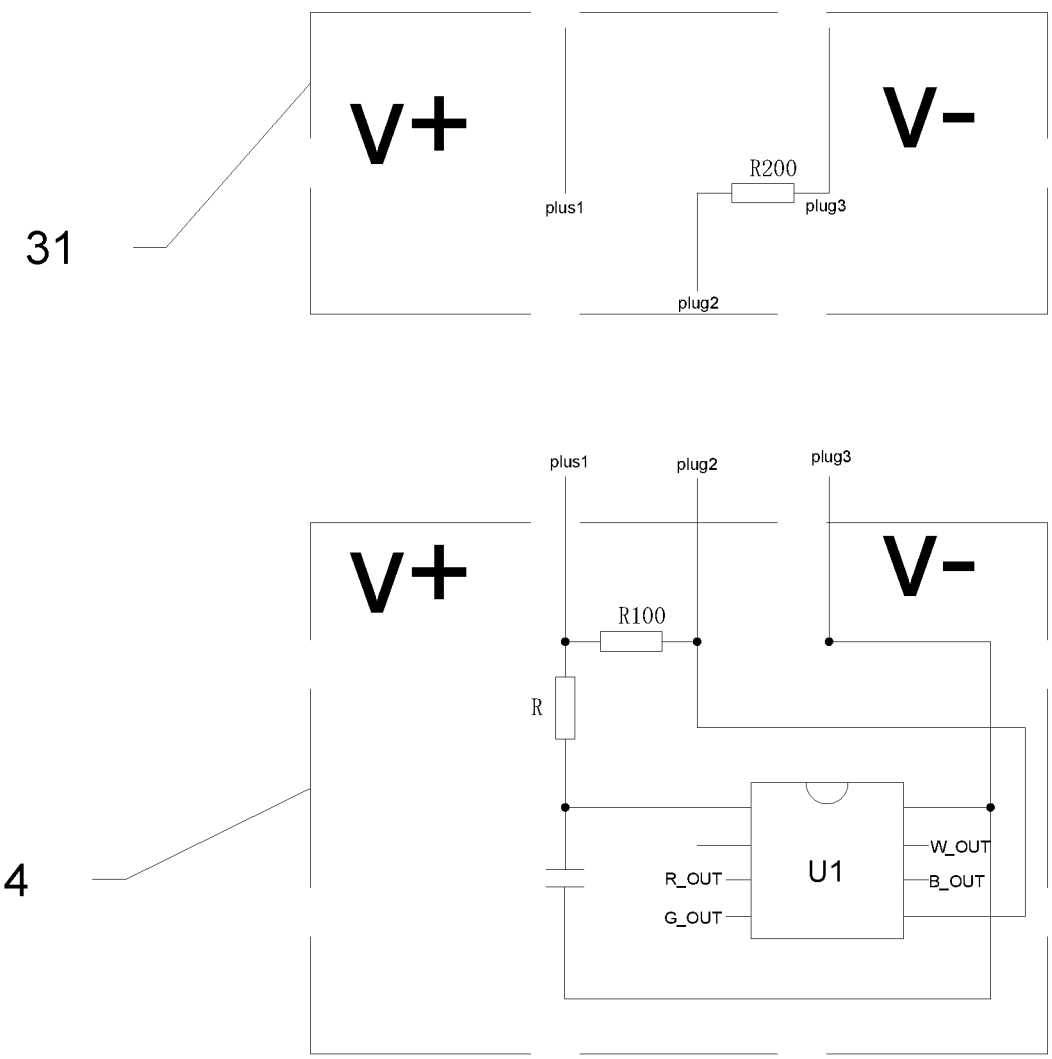
FIG. 7 is a schematic circuit diagram according to a first specific embodiment of the present invention.

With reference to FIGS. 1-2, preferably, the power control module 2 includes an AC-DC step-down circuit 21, a control circuit 24 and an output driving circuit 23. The AC-DC step-down circuit 21 outputs a power supply VCC to the control circuit 24. The control circuit 24 includes a resistor R15, a diode D5, a capacitor C11, a capacitor C12, a control chip U5, a wireless control module a switch SW1 and a control key S1. With reference to FIG. 6, the control chip U5 is specifically F160F021-RB. An output end of the AC-DC step-down circuit 21 is connected to one end of the resistor R15, the other end of the resistor R15 is connected to a first pin of the control chip U5, a cathode of the diode D5 is connected to the first pin of the control chip U5, and an anode of the diode D5 is grounded. One end of the capacitor C11 is connected to the first pin of the control. chip U5, while the other end the capacitor C11 is grounded. One end of the capacitor C12 is connected to the first pin of the control chip U5, while the other end of the capacitor C12 is grounded. A first pin of the wireless control module H1 is connected to a fifth pin of the control chip U5. A fourth pin of the wireless control module H1 is connected to a fourth pin of the control chip L15. The switch SW1 is connected to an eighth pin of the control chip U5, the control key S1 is connected to a sixth pin of the control chip U5, and the switch SW1 controls connection or disconnection between the eighth pin of the control chip U5 and the sixth pin of the control chip U5 through the control key S1.

Figure 5:
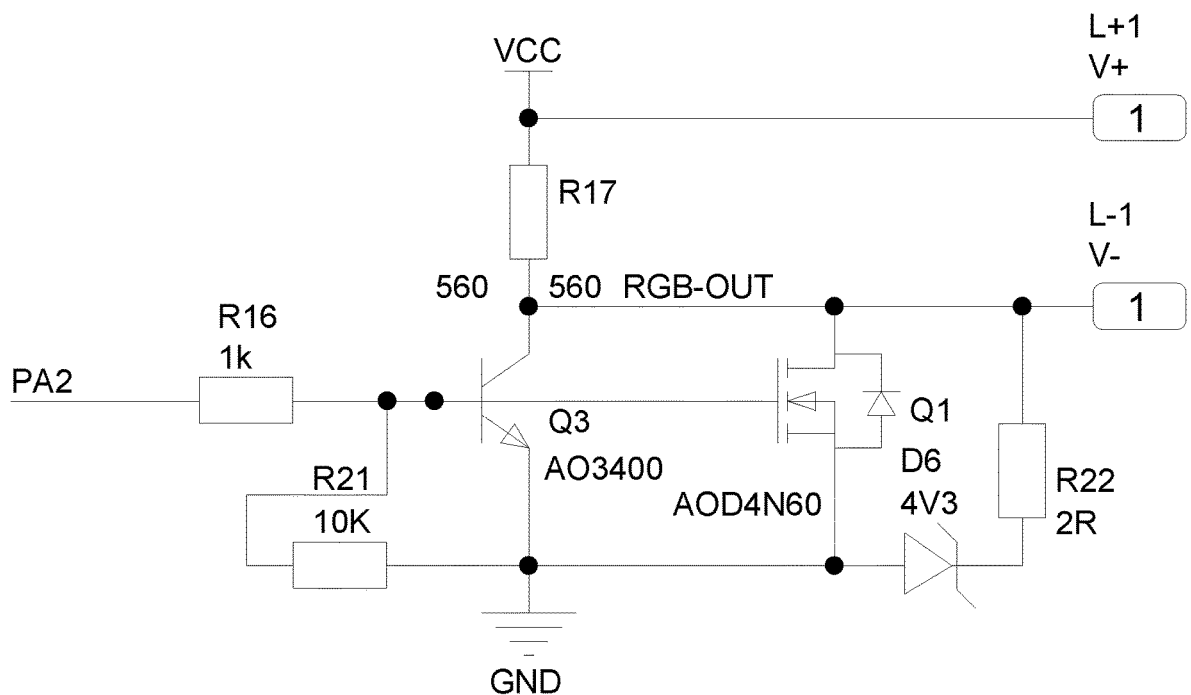
FIG. 5 is a specific circuit diagram of an output driving circuit according to the present invention.

With reference to FIG. 5, preferably, the output driving circuit 23 includes a resistor R16, a resistor R17, a resistor R21, a resistor R22, a triode Q3, an MOS transistor Q1 and a diode D6. One end of the resistor R16 is connected to a third pin of the control chip U5, the other end of the resistor R16 is connected to a base of the triode Q3, an emitter of the triode Q3 is grounded, and a collector of the triode Q3 is connected to the power supply VCC through the resistor R17. A connection node between the resistor R17 and the collector of the triode Q3 forms the output negative terminal V−, and a connection node between the resistor R17 and the power supply VCC forms the output positive terminal V+. A G electrode of the MOS transistor Q1 is connected to the base of the triode Q3, an S electrode of the MOS transistor Q1 is grounded, and a D electrode of the MOS transistor Q1 is connected to the output negative terminal V−. An anode of the diode D6 is grounded, while a cathode of the diode D6 is connected to the output negative terminal V− through the resistor R22.

The application principle will be described below. After the controller is plugged into a power supply, the AC-DC step-down circuit 21 converts an 120V/60 HZ AC power supply into a DC power supply, a voltage stabilizer circuit composed of the resistor R15 and the diode D5 supplies power to the control chip U5, and the control circuit 24 is controlled by the wireless control module H1 and the control key S1 to transmit different pulse width signals to the output driving circuit 23, so as to drive loads.

With reference to FIG. 5, preferably, the power control module 2 further includes a zero-cross signal detection circuit 22. The zero-cross signal detection circuit 22 includes a resistor R12, a resistor R13 and a photoelectric coupler U3. The photoelectric coupler U3 is specifically PC817. One end of the resistor R13 is connected to the AC-DC step-down circuit 21, while the other end of the resistor R13 is connected to a first pin of the photoelectric coupler U3. A fourth pin of the photoelectric coupler U3 is connected to a seventh pin of the control chip U5. The zero-cross signal detection circuit 22 is used for power failure detection or time counting to protect the whole circuit.

Figure 8:
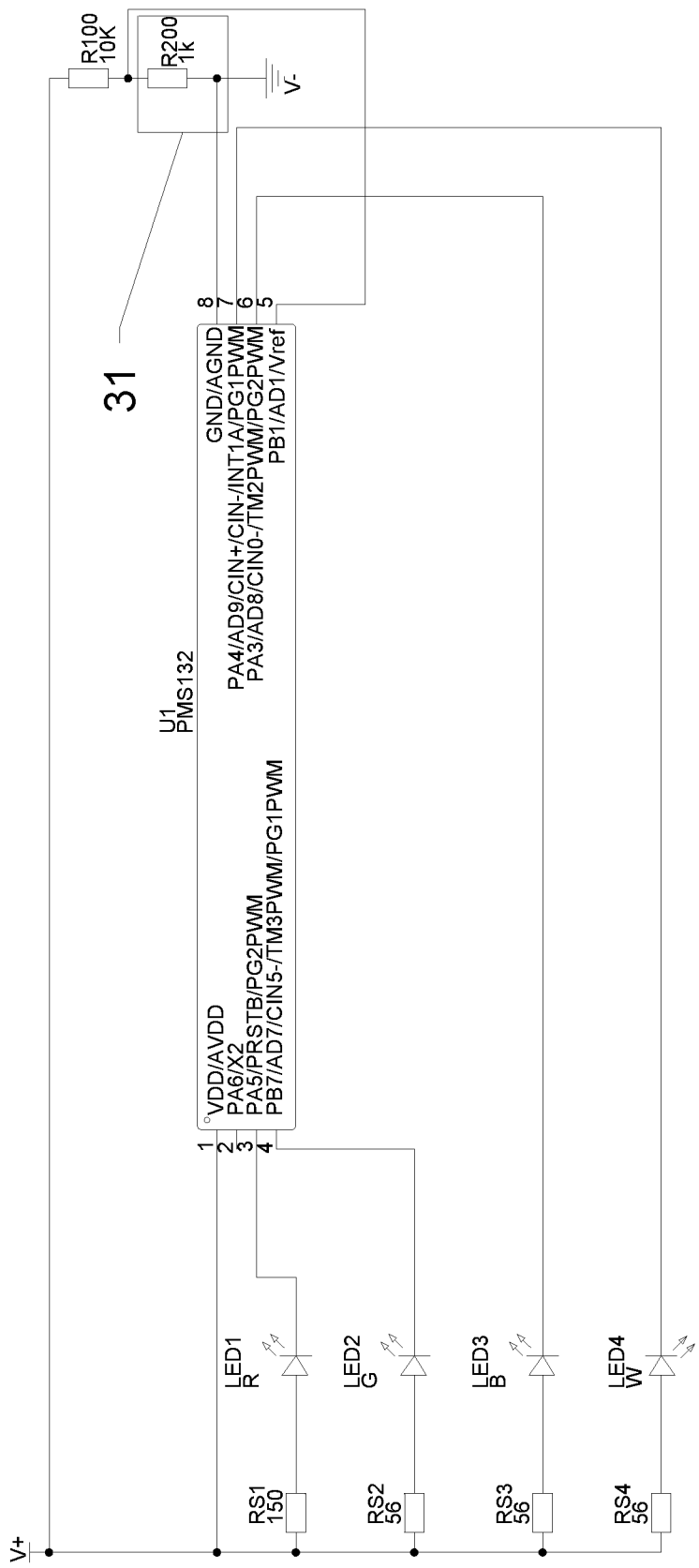
FIG. 8 is a specific circuit diagram according to the first specific embodiment of the present invention.

With reference to FIG. 8, in this specific embodiment, the address signal modules in the lamp holders 3 are resistors R2, and the resistors R2 in the lamp holders are different in resistance. The address identification and processing modules in the bulbs 4 include resistors R1, control chips U1 and RGBW head modules. The bulbs 4 are connected to the lamp holders 3, and the control chips U1 are connected to the output positive terminal V+ and the output negative terminal. V−, respectively, to form a communication loop. The resistors R1 and the resistors R2 form a voltage divider circuit. The resistors R2 output corresponding electrical signals to the control chips U1, and the control chips U1 control the RGBW bead modules according to the electrical signals.

With reference to FIG. 8, the specific circuit structure in this specific embodiment will be described below.

The control chips U1 are specifically PMS132. Each of the RGBW bead modules include a red lamp set LED1, a green lamp set LED2, a blue lamp set LED3 and a white lamp set LED4. One end of each of the resistors R1 is communicated with the respective control chip U1, a first pin of the control chip U1 is connected to the output positive terminal V+, and the other end of the resistor R1 is communicated with a fifth pin of the control chip U1. The other end of the resistor R1 is further connected to one end of the respective resistor R2, the other end of the resistor R2 is communicated with an eighth pin of the control chip U1, and the eighth pin of the control chip U1 is connected to the output negative terminal V−. The red lamp set LED1 is communicated with a third pin of the control chip U1, the green lamp set LED2 is communicated with a fourth pin of the control chip U1, the blue lamp set LED3 is communicated with a sixth pin of the control chip UU1, and the red lamp set LED4 is communicated with a seventh pin of the control chip U1.

Figure 9:
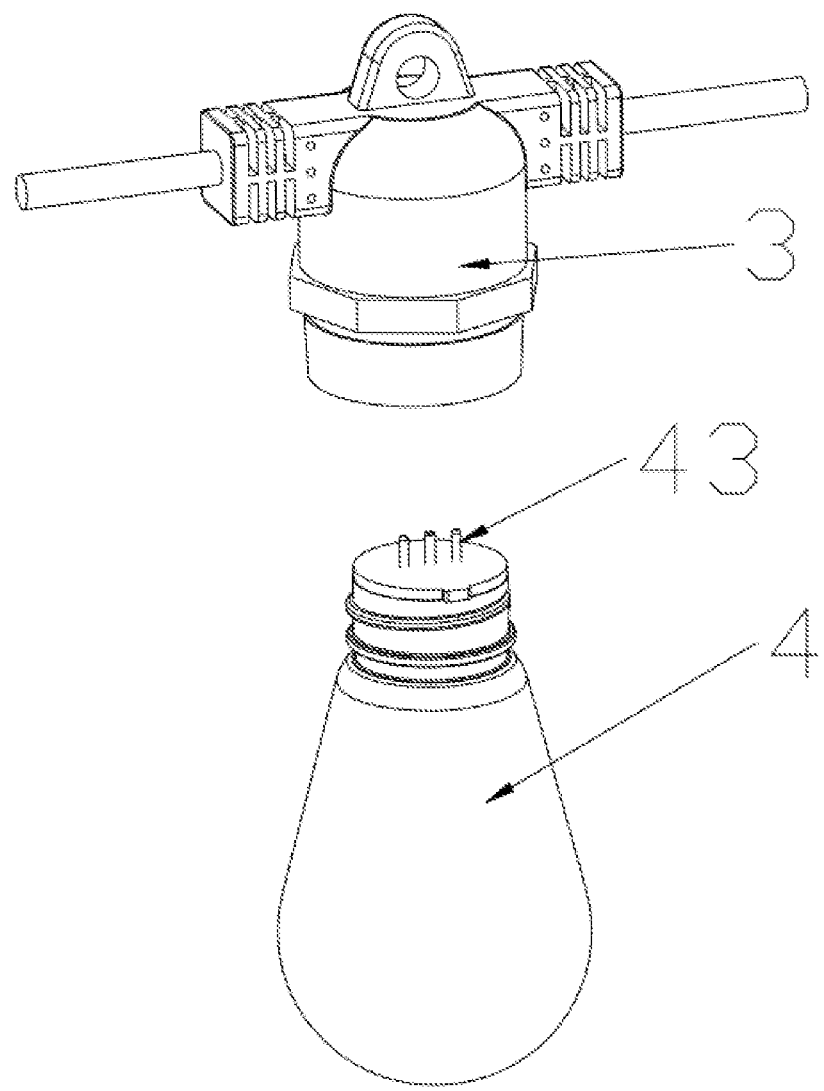
FIG. 9 is a specific schematic structural diagram showing assembling of bulbs with lamp holders according to the present invention.

With reference to FIG. 9, during a specific implementation, the bulbs 4 are each designed with a three-pin plug 43, and the lamp holders 3 are each correspondingly designed with a three-hole socket.

The foregoing implementations are merely preferred implementations of the present invention and not intended to limit the scope of the present invention. Various variations and improvements made to the technical solutions of the present invention by a person of ordinary skill in the art without departing from the design spirit of the present invention shall fall into the protection scope defined by the appended claims of the present invention.

The invention claimed is:

1. An intelligent lamp string with integrated power control, comprising:
    a power plug connected to a mains supply,
    a power control module,
    a plurality of lamp holders; and
    a plurality of bulbs,
    wherein the power plug is electrically connected to the power control module for controlling power and outputting a driving signal; the power control module is provided with an output positive terminal (V+) and an output negative terminal (V−);
    the plurality of lamp holders are electrically connected to the output positive terminal (V+) and the output negative terminal (V−), respectively; address signal modules for distinguishing different lamp holders are arranged in the lamp holders; address identification and processing modules for identifying addresses of the lamp holders and outputting corresponding signals are arranged in the bulbs; the bulbs are detachably connected to the lamp holders to form a communication loop; the address identification and processing modules in the bulbs are electrically connected to the address signal modules in the lamp holders; and, the address identification and processing modules identify the address signal modules and output corresponding electrical signals to control the change of the bulbs;
    wherein the power control module comprises an AC-DC step-down circuit, a control circuit and an output driving circuit the AC-DC step-down circuit outputs a power supply (VCC) to the control circuit the control circuit comprises a first resistor ((R15), a first diode (D5), a first capacitor ((C11)), a second capacitor (C12)), a first control chip (U5), a wireless control module (H1), a switch (SW1) and a control key (S1); the first control chip (U5) is specifically FT60F021-RB, an output end of the AC-DC step-down circuit is connected to one end of the first resistor (R15), the other end of the first resistor (R15) is connected to a first pin of the first control chip (U5), a cathode of the first diode (D5) is connected to the first pin of the first control chip (U5), and an anode of the first diode (D5) is grounded; one end of the first capacitor (C11) is connected to the first pin of the first control chip (U5), while the other end of the first capacitor (C11) is grounded; one end of the second capacitor (C12) is connected to the first pin of the first control chip (U5), while the other end of the second capacitor (C12) is grounded; a first pin of the wireless control module (H1) is connected to a fifth pin of the first control chip (U5); a fourth pin of the wireless control module (H1) is connected to a fourth pin of the first control chip (U5); the switch (SW1) is connected to an eighth pin of the first control chip (U5); the control key (S1) is connected to a sixth pin of the first control chip (U5); and, the switch (SW1) controls the connection or disconnection between the eighth pin of the first control chip (U5) and the sixth pin of the first control chip (U5) through the control key (S1).

2. The intelligent lamp string with integrated power control according to claim 1, wherein the output driving circuit comprises a second resistor (R16), a third resistor (R17), a fourth resistor (R21), a fifth resistor (R22), a triode (Q3), an MOS transistor (Q1) and a second diode (D6); one end of the second resistor (R16) is connected to a third pin of the first control chip (U5), the other end of the second resistor (R16) is connected to a base of the triode (Q3), an emitter of the triode (Q3) is grounded, and a collector of the triode (Q3) is connected to the power supply (VCC) through the third resistor (R17); a connection node between the third resistor (R17) and the collector of the triode (Q3) forms the output negative terminal (V−), and a connection node between the third resistor (R17) and the power supply (VCC) forms the output positive terminal (V+); a G electrode of the MOS transistor (Q1) is connected to the base of the triode (Q3), an S electrode of the MOS transistor (Q1) is grounded, and a D electrode of the MOS transistor (Q1) is connected to the output negative terminal (V−); and, an anode of the second diode (D6) is grounded, while a cathode of the second diode (D6) is connected to the output negative terminal (V−) through the fifth resistor (R22).

3. The intelligent lamp string with integrated power control according to claim 1, wherein the power control module further comprises a zero-cross signal detection circuit; the zero-cross signal detection circuit comprises a sixth resistor (R12), a seventh resistor (R13) and a photoelectric coupler (U3); the photoelectric coupler (U3) is specifically PC817; one end of the seventh resistor (R13) is connected to the AC-DC step-down circuit, while the other end of the seventh resistor (R13) is connected to a first pin of the photoelectric coupler (U3); and, a fourth pin of the photoelectric coupler (U3) is connected to a seventh pin of the first control chip (U5).

4. The intelligent lamp string with integrated power control according to claim 1, wherein the address signal modules in the lamp holders are eighth resistors (R2), and the eighth resistors (R2) in the lamp holders are different in resistance; the address identification and processing modules in the bulbs comprise ninth resistors (R1), second control chips (U1) and RGBW bead modules; the bulbs are connected to the lamp holders, and the second control chips (U1) are connected to the output positive terminal (V+) and the output negative terminal (V−), respectively, to form a communication loop; the ninth resistors (R1) and the eighth resistors (R2) form a voltage divider circuit; and, the eighth resistors (R2) output corresponding electrical signals to the second control chips (U1), and the second control chips (U1) control the RGBW bead modules according to the electrical signals.

5. The intelligent lamp string with integrated power control according to claim 4, wherein the second control chips (U1) are specifically PMS132; one end of each of the ninth resistors (R1) is communicated with the respective control chip (U1), a first pin of the second control chip (U1) is connected to the output positive terminal (V+), and the other end of each ninth resistor (R1) is communicated with a fifth pin of the second control chip (U1), and, the other end of each ninth resistor (R1) is further connected to one end of the respective eighth resistor (R2), the other end of each eighth resistor (R2) is communicated with an eighth pin of the second control chip (U1), and the eighth pin of the second control chip (U1) is connected to the output negative terminal (V−).

\* \* \* \* \*